United States Patent Office 3,709,832
Patented Jan. 9, 1973

3,709,832
METHOD FOR THE PREPARATION OF A CATALYST USABLE FOR CATALYTIC CRACKING OF HYDROCARBONS
Takeo Ao, Osaka, Japan, assignor to Osaka Yogyo Kabushiki Kaisha, Osaka, Japan
No Drawing. Continuation-in-part of application Ser. No. 869,863, Oct. 27, 1969. This application Sept. 24, 1970, Ser. No. 75,289
Int. Cl. C10g 11/04
U.S. Cl. 252—429 R   4 Claims

ABSTRACT OF THE DISCLOSURE

This invention relates to a method for the preparation of a catalyst usable for catalytic cracking of hydrocarbons, characterized by the steps of (I) pulverizing a carrier member selected from the group consisting of α-alumina containing above 98% of $Al_2O_3$, a magnesium clinker containing above 96% of MgO and below 1% of an iron oxide, SiC, $ZrO_2$, ZnO, $ThO_2$, $MoO_2$ and $Fe_2O_3$ into particles passing through a Tyler Standard 65-mesh sieve, (II) mixing the particles with a nickel oxide in an amount of 1 to 30% by weight and a binder which comprises
  (A) 0.1 to 2.8% by weight of starch treated with acid until the outer skin is destroyed and then heating at 100° to 300° C.;
  (B) 0.05 to 2.5% by weight of a member selected from the group consisting of alkali metal carbonates and phosphates, calcium, magnesium and ammonium carbonates, chlorides, fluorides, sulfates and phosphates, zinc and iron phosphates and mixtures thereof, and
  (C) 0.05 to 2.5% by weight of a member selected from the group consisting of chlorides and phosphates of the material of Step I with the proviso that (1) the total weight components A, B and C do not exceed 0.2 to 3% of the particles of Step I, (2) that components B and C be different and (3) the ratio of $A/A+B+C$ is between 0.38 and 0.98, $B/A+B+C$ is between 0.017 and 0.945 and $C/A+B+C$ is between 0.17 and 0.945;

(III) molding the mixture to a shaped product, drying the shaped product and (IV) then calcining the dried product at a temperature of about 1250° C. to about 1350° C. to produce the catalyst.

Alternatively, the binder may be calcined without the nickel oxide, subsequently impregnated with nickel oxide and calcined again.

---

This application is a continuation-in-part of application Ser. No. 869,863 filed Oct. 27, 1969 now abandoned.

This invention relates to a method for the preparation of a catalyst usable for catalytic cracking of hydrocarbons, characterized by comprising the steps of pulverizing a carrier member selected from the group consisting of $Al_2O_3$, MgO, Sic, $ZrO_2$ $MoO_2$, ZnO, $ThO_2$ and $Fe_2O_3$, which have high purity, into particles, mixing said particles with a nickel oxide in an amount of 1 to 30% by weight and a special binder admixture as defined hereinafter to form a moldable homogeneous mixture, molding said mixture into a shaped product, drying said shaped product and then calcining the dried product at a relatively low temperature ranging from about 1250° C. to about 1350° C. to produce said catalyst. In accordance with a modification of this invention, the catalyst thus produced is further immersed in an aqueous solution containing nickel nitrate until the catalyst is impregnated with a nickel oxide in an amount of about 1 to about 5% by weight of a nickel oxide calculated as NiO, and then the immersed catalyst is calcined at a very low temperature, about 550° C. to 650° C. (preferably 600° C.), to produce a catalyst usable for catalytic cracking of hydrocarbons.

Generally speaking, a nickel catalyst is made by using a refractory carrier such as alumina, magnesia, dolomite, clay or a high siliceous material which is a non-plastic material. One of the qualitative properties of the carrier material required is its thermostability and another of them is its high activity in itself. It is well known that high purity α-alumina, magnesia and the like are most satisfactory with regard to these two properties.

However, such pure materials cannot be sintered at all at temperatures of below 1350° C. because they have high melting points and they are also entirely unusable as a main component for the preparation of such a nickel catalyst because of their serious lack of their physical and mechanical strength. Even though these pure materials can be well-sintered at a temperature of above 1600° C., in such a case, the activity of a nickel oxide is completely lost. When the conventional inorganic sintering agents such as boric acid, alkali, a calcium oxide and the like used in the prior art, are added in an amount of several percent to the refractory carrier, the sintering temperature of the carrier decreases to some extent, but the thermostability of the carrier is also reduced at the same time and the activity of the catalyst is lowered since the surface of nickel oxide is coated with such a sintering agent. Because of these characteristics of the refractory carrier, it is considered in the prior art that such a nickel catalyst cannot be produced by using a mixing-calcining process in which high purity material of alumina or magnesia is used alone as the refractory carrier.

However, the inventor has found as a result of a long-time investigation and research that it is possible to prepare a strong solid shaped product in the dry state by adding about 0.2 to 30% by weight of a special admixture to the refractory carrier by the mixing process and it is possible to manufacture a strong catalyst having a high catalytic activity, thermal stability and mechanical strength by calcining said shaped product at a relatively low temperature of about 1250° C. to 1350° C. The special admixture is fully described hereinafter.

The special admixture used in accordance with this invention is substantially constructed of three components: A, B and C. The component A is a material which serves to give plasticity to the refractory material and also has an important effective function for preventing the catalyst or carrier from cracking when said catalyst or carrier is dried at a temperature between about 60° C. and about 120° C.

Component A is a material produced by uniformly calcining starch, e.g., in a kiln at a temperature of from 100° C. to 300° C. after the outer skin is destroyed. Generally, any kind of starch is suitable, however, potato starch and especially starch from the tuberous root of the devil's tongue are preferred. The starch is treated with an organic acid, e.g., a carboxylic acid such as lactic acid, acetic acid or citric acid or an inorganic acid such as hydrochloric, nitric or sulfuric acid. Heating times of about 40 to 80 minutes are preferred.

Component B is a material which gives plasticity to the refractory material and performs an effective function for preventing the catalyst or carrier from any cracking when said catalyst or carrier is dried at a temperature between about 800° C. and 1200° C. The component B is a material which is selected from the group consisting of carbonates and phosphates of alkali metal, such as $Na_2CO_3$, $K_2CO_3$ and $KH_2PO_4$, carbonates, chlorides, fluorides, sulfates and phosphates of Ca, Mg and $NH_4$, such as $CaCl_2$, $MgCl_2$, $Mg(NO_3)_2$, $MgSO_4$, $MgF_2$, $MgCO_3$, $(NH_4)_2CO_3$ and $MgHPO_4$, phosphates of zinc and iron, such as $Zn_3(PO_4)_2$ and $FeHPO_4$.

Component C is a material which includes chlorides and phosphates of said refractory material, and it has chemical characteristics as in a cement comprising oxides, chlorides and phosphates of said refractory material, e.g., $Al_2O_3$.

Component A is a material, 99% of which is evaporated at about 1000° C., and both the components A and B accelerate the sintering of the refractory material such as $Al_2O_3$, MgO, SiO, $ZrO_2$, $MoO_2$, ZnO, $ThO_2$ or $Fe_2O_3$.

In accordance with the present invention, the total amount of the components A, B and C to be added as a special admixture is about 0.2 to 3% by weight based on the refractory material and either one or both members of the components B and/or C can be used depending on the conditions required for the maufacture of the carrier.

The so-called high purity alumina used in this invention must contain more than 98% of $Al_2O_3$. If the content of $Al_2O_3$ is less than 98%, the activity and the thermostability of the catalyst is reduced by the presence of iron oxides, silica and other impurities. The magnesia used in this invention must contain more than 96% of MgO and less than 1% of an iron oxide. If the contents of MgO is less than 96%, the activity and the thermostability of the catalyst is reduced by the other impure components and if the content of iron oxide is more than 1%, carbon is formed on the catalyst during use in the cracking operation.

It should be noted that the components A, B and C must be added to the (refractory) material (or the raw material) in an amount of 0.1 to 2.8%, 0.05 to 2.5% and 0.05 to 2.5% by weight on the basis of the resultant mixture and also that the total amount of the special admixture must be as 0.2 to 3% by weight on the basis of the resultant mixture. It should also be noted that the thermostability and durability of the catalyst are undesirably decreased when the components B and C are used in an amount of above 2.5%.

The following Table 1 shows the sintering property of the carrier which is prepared by using the special admixture of this invention in comparison with the sintering property of the carrier which is prepared by using the conventional organic binders.

The spent pulp liquor used in the following Comparative Examples was analyzed as follows:

| | G./1. |
|---|---|
| Specific gravity = 1.097 at 15° C. | |
| Total sulfur | 12.6 |
| Total sulfurous acid ($H_2SO_3$) | 6.1 |
| Total sulfuric acid ($M_2SO_4$) | 2.4 |
| Total ashes | 24.5 |
| Total calcium (calculated as CaO) | 7.3 |
| Total sugar | 31.2 |
| Total ligninsulfonic acid | 95.5 |

Component A (or the starch) used in the following examples is prepared as follows:

The starch is produced from the tuberous root of devil's tongue which was treated with lactic acid for 2 days at atmospheric pressure for destroying the outer skin of the starch and then the treated starch was heated in a rotary kiln at 150° C. for one hour.

TABLE 1

| | Example 1 | Comparative Example 1 | Example 2 | Comparative Example 2 |
|---|---|---|---|---|
| Material for mixing (wt. percent): | | | | |
| Alumina passed through 200 mesh | 99 | 99 | | |
| Magnesium clinker passed through 200 mesh | | | 98 | 98 |
| Special admixture | Component A=0.6; Component B, $Na_2CO_3$=0.2; Component C, aluminum phosphate=0.2; Total=1%. | | A=0.6; B, $Na_2CO_3$=0.2; C, magnesium chloride=0.2; Total=1%. | |
| Spent liquor from the pulp making | | 1 | | 1 |
| Molding | Friction press | Friction press | Friction press | |
| Drying | 100° C., 3 hrs | 100° C., 3 hrs | 100° C., 3 hrs | |
| Calcining | 1,350° C., 4 hrs | 1,350° C., 4 hrs | 1,350° C., 4 hrs | |
| Tested for: | | | | |
| Porosity (percent) | 28.2 | 32.3 | 27.1 | 32.2 |
| Apparent specific gravity | 3.83 | 3.82 | 3.49 | 3.47 |
| Bulk specific gravity | 2.75 | 2.59 | 2.54 | 2.35 |
| Compressive strength (kg./cm.², shaped) | 145 | 56 | 156 | 41 |
| Compressive strength (kg./cm.², calcined) | 730 | 240 | 827 | 333 |
| $Al_2O_3$ | 97 | 97 | | |
| MgO (percent) | | | 96 | 96 |

The refractory materials used in this invention must be made into a finely divided particle size passing through a Tyler Standard 65-mesh sieve, because in the case when the size of these refractory materials are larger than that of 65-mesh, satisfactory sintering cannot be expected under calcining conditions such as low temperatures of 1250° C. to 1300° C.

The content of nickel oxide is set at 1–30% because the satisfactory activity of the catalyst cannot be expected when the content of nickel oxide is less than 1% and an excessive amount of nickel oxide is required for a catalyst when the content of nickel oxide is more than 30%.

In accordance with a modification of this invention, the catalyst as mentioned above is immersed in an aqueous solution containing nickel nitrate until the catalyst is impregnated with an additional nickel oxide in an amount of 1 to 5% by weight of a nickel oxide calculated as NiO, and then the immersed catalyst is calcined to produce a catalyst for improving the initial activity of said catalyst.

The proportions of components A, B and C are of extreme importance. Thus, not only must the combined weight of A, B and C be between 0.2 and 3% by weight of the refractory, e.g., $Al_2O_3$ but also the ratio of $A/(A+B+C)$ must be between 0.038 and 0.93, $B/(A+B+C)$ must be between 0.017 and 0.945 and $C/(A+B+C)$ must be between 0.017 and 0.945.

Thus, when component A is used in an amount of below 0.1%, a satisfactory result cannot be obtained and when it is used in an amount of above 2.8%, the porosity of the carrier is undesirably increased and when the components B and C are used in an amount of below 0.05%, a satisfactory result cannot be obtained in each case and when they are used in an amount of above 2.5%, the thermostability and durability of the carrier (or the catalyst) are undesirable decreased.

That Examples 1 and 2 comply with these requirements is evident from Table 1A.

It is apparent from the data as shown in Table 1 that the special admixture used in this invention is remarkably effective from the points of their compressive strength and etc.

Examples 1 and 2 indicate far more excellent results in the compressive strength both in the shaped product (unburned) and the calcined product as compared with those of their comparative examples. Furthermore, it was found from the Examples 1 and 2 that the thermostability and activity of the carrier and the catalyst was not reduced at all.

In Table 1, the amounts of the components A, B and C, the total amount of the special admixture, and the ratios of A: $(A+B+C)$, B: $(A+B+C)$ and C: $(A+B+C)$ are summarized in the following Table 1A.

TABLE 1A

| Example | A | B | C | A+B+C | A/(A+B+C) | B/(A+B+C) | C/(A+B+C) |
|---|---|---|---|---|---|---|---|
| 1 | 0.6 | 0.2 | 0.2 | 1.0 | 0.6 | 0.2 | 0.2 |
| 2 | 0.6 | 0.2 | 0.2 | 1.0 | 0.6 | 0.2 | 0.2 |

The industrial advantages of this invention are described hereinafter.

High catalytic cracking for the manufacture of a town gas is carried out by using a highly active $NiO-Al_2O_3$ type catalyst and naphtha hydrocarbons feed. In general, the conventional catalysts are required to use the clay component in an amount of 10 to 15% by weight for achieving the satisfactory sintering characteristics and workability but such catalysts are unsatisfactory with regard to their activity and strength. In comparing the activity of the catalyst of this invention with that of the conventional catalysts from gasifying propane as a test sample, the conversion ratio $(Nm.^3/Nm.^3)$ of the propane, which is gasified in the presence of the catalyst of this invention, is 9.56, and the conversion ratio in the presence of the conventional catalyst is 8.76. The deterioration and attrition index of the catalyst of this invention is less than 0.4% and that of the conventional catalyst is 2.4%. These figures show that the catalyst of this invention has much better characteristics with respect to activity and durability.

Furthermore, a NiO-MgO type catalyst of this invention and the commercially available NiO-MgO type catalyst were tested under the same conditions for their activities in gasifying propane. And it was found that the conversion ratio in the presence of the catalyst of this invention is 9.34 and that of the conventional catalyst is 8.95. The attrition index of the catalyst of this invention is 0.3% and that of the conventional catalyst is 0.5%. These evaluations indicate that the shaped unburned product and the catalyst of this invention are superior to those of the conventional products and catalysts.

As described, if taken into consideration the operation cost reduced by the high activity of the catalyst and the cost reduced by the elongation of the catalyst life, the cost of the catalyst of this invention becomes far less than that of the conventional catalysts. Also, the industrial advantages of the catalyst of this invention is quite significant because the catalyst of this invention can be prepared with a reasonable cost as compared with that of the conventional catalysts.

It should be noted that the catalysts of this invention are widely available for producing a town gas by the catalytic cracking of naphtha and a crude oil and also they are available for producing an atmosphere gas to be used as a metal cleaner in the metal industry by a partial cracking of propane.

As for illustrating this invention, there are given the following examples in which the catalyst of this invention is used for the preparation of a town gas by the cracking of naphtha hydrocarbons.

EXAMPLE 3

A mixture of 90 parts by weight of electrically fused white alumina having a size which passes through a Tyler Standard 200-mesh sieve, 10 parts by weight of nickel oxide having the same size as the white alumina, 0.3 part by weight of component A, 0.3 part by weight component B—$K_2CO_3$ and 0.1 part by weight component C, $AlPO_4$ were molded into a granular shaped product having a size of 3 to 25 millimeters in diameter by using a pelletizing pan. After the granular product was calcined at a temperature of about 1250° C. to 1300° C., the granular product was upgraded to an excellent catalyst having the refractoriness as high as SK 40 Seger cones and the compressive strength of 600 kg./cm.$^2$. The catalyst was used for gasifying hydrocarbons such as propane having a 98% purity. The propane was fed on a bed of the catalyst at 900° C. and the space velocity of 800 cc. per hour per cc. of the catalyst for carrying out a catalytic reaction. In this case, the propane was mixed with steam in the weight ratio of 1.5 of steam to propane. The catalytic reaction was continued until the propane was gasified into a gaseous product with the normal running yield of 9.56 Nm.$^3$/Nm.$^3$. The gaseous product was analyzed as follows:

|  | Percent |
|---|---|
| $CO_2$ | 2.0 |
| $C_mH_n$ | 0.1 |
| $O_2$ | 0.3 |
| CO | 27.3 |
| $H_2$ | 63.0 |
| $CH_4$ | 6.6 |
| $N_2$ | 0.7 |

EXAMPLE 4

A mixture of 93 parts by weight of a high purity magnesium clinker was passed through a Tyler Standard 65-mesh sieve, 7 parts by nickel oxide having a size which pass through a Tyler Standard 200-mesh sieve and 0.3 part by weight of component A, 0.1 part by weight component B—$K_2CO_3$ and 0.1 part by weight component C—$MgCl_2$ were molded into a granular product having a size of 3 to 25 millimeters in diameter by using a pelletizing pan. The granular product was calcined at a temperature of 1250° C. to 1300° C. to produce a catalyst having a thermal stability of above SK 40 and a compressive strength of 700 kg./cm.$^2$. The catalyst was used for gasifying propane having a 98% purity. The propane was fed on the bed of the catalyst at 900° C. and a space velocity of 800 cc. per hour per cc. of the catalyst for carrying out a catalytic reaction. In this case, the propane was mixed with steam in the weight ratio of 1.5 of steam to propane. The catalytic reaction was continued until the propane was gasified into a gaseous product with the normal yield of 9.34 Nm.$^3$/Nm.$^3$. The gaseous product is analyzed as follows:

|  | Percent |
|---|---|
| $CO_2$ | 1.0 |
| $C_mH_n$ | 0.6 |
| $O_2$ | 0.3 |
| CO | 26.1 |
| $H_2$ | 60.5 |
| $CH_4$ | 9.7 |
| $N_2$ | 1.8 |

It is obvious from the yield of 9.56 Nm.³/Nm.³ and 9.34 Nm.³/Nm.³, and the low content of the CmHn component as shown in Examples 3 and 4 that the catalysts of this invention have high catalytic activity.

EXAMPLE 5

A catalyst was prepared in the same manner as in Example 4 and then the catalyst was immersed into an aqueous solution containing nickel nitrate until the catalyst was impregnated with a 4% nickel oxide calculated as NiO. The impregnated catalyst was calcined at 700° C. to produce a catalyst having a thermal stability of above SK 40, a compressive strength of 730 kg./cm.² and a total nickel oxide (NiO) content of 11%. The catalyst was used for gasifying propane having a 98% purity. The propane was fed on the bed of the catalyst at 900° C. and a space velocity of 800 cc. per hour per cc. of the catalyst for carrying out a catalytic reaction. In this case, the propane was mixed with steam in the weight ratio of 1.5 of steam to propane. The catalytic reaction was continued until the propane was gasified into a gaseous product with the normal running yield of 9.42 Nm.³&Nm.³. It was found that the catalyst has high primary start-up activity for obtaining an earlier initial gaseous product with an initial yield of 9.06 Nm.³/Nm.³ which is compared with an initial yield of 8.37 Nm.³/Nm.³ obtained by the catalytic reaction in Example 4.

The initial gaseous product and the normal product were analyzed and compared with the initial gaseous product and the normal gaseous product obtained by the catalytic reaction in Example 4 in the following Table 2.

It is obvious from the data as shown in the above table that the catalyst indicated in Examples 4 and 5 of this invention have high catalytic activity, for example, the gas yield obtained by Example 4 is low in the CmHn content but the gas yield is greatly improved at the stage of the normal running and can be elevated equally to that of the Example 5. On the other hand, the gas yield obtained by Example 5 can be favorably continued at high level at either the primary start-up or the normal running. Further runs produced the following results:

TABLE 3

| Example | 6 | 7 | 8 | 9 | 10 | 11 |
|---|---|---|---|---|---|---|
| Materials, wt. percent: | | | | | | |
| Alumina passed through 65 meshes | 100 | 100 | | | | |
| Zirconium dioxide passed through 65 meshes | | | 100 | 100 | | |
| Silicon carbide passed through 65 meshes | | | | | 100 | 100 |
| Special admixture: | | | | | | |
| A | 0.1 | 2.8 | 0.45 | 0.1 | 0.45 | 0.1 |
| B | Na₂CO₃, 2.5 | Na₂CO₃, 0.1 | CaCl₂, 0.05 | CaCl₂, 2.5 | MgSO₄, 2.5 | MgSO₄, 0.05 |
| C | AlCl₃, 0.05 | AlCl₃, 0.1 | ZrCl₄, 2.5 | ZrCl₄, 0.05 | SiCl₄, 0.05 | SiCl₄, 2.5 |
| Step: | | | | | | |
| Molding | Using an oil press at 500 kg./cm.² | | | | Using a friction type press | |
| Drying | 100° C., 13 hours | | | | 110° C., 4 hours | |
| Calcining (gas oven) | SK 26, one hour | | | | SK 18, 3 hours | |
| Tested for: | | | | | | |
| Porosity (percent) | 35.6 | 45.7 | 31.5 | 28.4 | 13.3 | 16.4 |
| Apparent specific gravity | 3.92 | 4.02 | 4.43 | 4.40 | 3.04 | 3.07 |
| Bulk specific gravity | 2.52 | 2.18 | 3.04 | 3.15 | 2.64 | 2.57 |
| Compressive strength (kg./cm.²)(dried body before calcined) | 85 | 275 | 380 | 105 | 204 | 95 |
| Compressive strength (kg./cm.²)(calcined) | 1,830 | 540 | 1,760 | 2,470 | 1,520 | 1,270 |
| Materials: | | | | | | |
| Al₂O₃ (percent) | 95 | 96 | | | | |
| ZrO₂ (percent) | | | 98 | 96 | | |
| SiC (percent) | | | | | 94 | 94 |
| A/(A+B+C) | 0.038 | 0.93 | | | | |
| B/(A+B+C) | | | 0.017 | 0.945 | | |
| C/(A+B+C) | | | | | 0.017 | 0.945 |

As is apparent from Table 3 in accordance with this invention, the ratio of $A/(A+B+C)$ is varied from 0.038 (minimum) to 0.93 (maximum), the ratio of $$B/(A+B+C)$$

is varied from 0.017 (minimum) to 0.945 (maximum) and the ratio of $C/(A+B+C)$ is varied from 0.017 (minimum) to 0.945 (maximum). These ratios are shown in the following Table 4.

TABLE 4

| | Components | | | | A/(A+B+C) | | B/(A+B+C) | | C/(A+B+C) | |
|---|---|---|---|---|---|---|---|---|---|---|
| Example | A | B | C | A+B+C | Min. | Max. | Min. | Max. | Min. | Max. |
| 6 | 0.1 | 2.5 | 0.05 | 0.65 | 0.038 | | | | | |
| 7 | 2.8 | 0.1 | 0.1 | 3.0 | | 0.93 | | | | |
| 8 | 0.45 | 0.05 | 2.5 | 3.0 | | | 0.017 | | | |
| 9 | 0.1 | 2.5 | 0.05 | 2.65 | | | | 0.945 | | |
| 10 | 0.45 | 2.5 | 0.05 | 3.0 | | | | | 0.017 | |
| 11 | 0.1 | 0.05 | 2.5 | 2.65 | | | | | | 0.945 |

The reasons why the upper and the lower limits of of the ratios of $A/(A+B+C)$, $B/(A+B+C)$ and The reasons why the upper and the lower limits $C/(A+B+C)$ must be defined by the above-indicated values are clarified as follows:

(i) The upper limit of $A/(A+B+C)$ is defined as 0.93 by using component A=2.8, component B=0.1 and component C=0.1. When the component A is used in an amount of above 2.8% by weight, the resultant carrier (or catalyst) is excessively increased in porosity and reduced in strength. When the components B and C are

TABLE 2

| Example | Gaseous products | CO₂ | CmHn | O₂ | CO | H₂ | CH₄ | N₂ |
|---|---|---|---|---|---|---|---|---|
| 5 | Primary start-up | 2.8 | 0.3 | 0.1 | 25.5 | 63.6 | 7.4 | 0.3 |
| | Normal running | 2.1 | 0.1 | 0.1 | 26.9 | 65.0 | 5.6 | 0.2 |
| 4 | Primary start-up | 3.5 | 0.7 | 0.2 | 25.0 | 62.2 | 7.7 | 0.7 |
| | Normal running | 3.0 | 0.1 | 0.2 | 26.2 | 64.3 | 5.9 | 0.3 | used in an amount of below 0.1% by weight, they cannot display their effective actions and results.

The lower limit of $A/(A+B+C)$ is defined as 0.038 by using the component $A=0.1$, the component $B=2.5$ and the component $C=0.05$. When component A is used in an amount of below 0.1% by weight, it cannot display its effective actions and results. When the component B is used in an amount of above 2.5% by weight, the resultant carrier (or catalyst) is reduced in its thermostability. Similarly, when the component C is used in an amount of above 0.05% by weight, the resultant carrier (or catalyst) is reduced in its thermostability.

(ii) The upper limit of $B/(A+B+C)$ is defined as 0.945 by using the component $A=0.1$, the component $B=2.5$ and the component $C=0.05$. When the component A is used in an amount of below 0.1% by weight, it cannot display its effective actions and results. When the component B is above 2.5% by weight, the resultant carrier (or catalyst) is excessively reduced in its thermostability. When the component C is below 0.05% by weight, it cannot display its effective actions and results. Similarly, the lower limit of $B/(A+B+C)$ is defined to 0.017 when the upper limit of the special admixture $(A+B+C)$ is 3.0% by weight and the component B is used in the amount of the lower limit of 0.05% by weight.

(iii) The upper limit of $C/(A+B+C)$ is defined as 0.945 by using component $A=0.1$, component $B=0.05$ and component $C=2.5$. When the component A is used in an amount of below 0.1% by weight and component B is used in an amount of below 0.05% by weight, they cannot display their effective actions and results. When the component C is used in an amount of above 2.5% by weight, the resultant carrier (or catalyst) is excessively reduced in its thermostability.

Similarly, the lower limit of $C/(A+B+C)$ is defined as 0.017 and the upper limit of the special admixture $(A+B+C)$ is 3.0% by weight. Component B is used in the amount of the upper limit of 2.5% by weight and the component C is used in the amount of the lower limit of 0.05% by weight. In this case, the resultant carrier (or catalyst) is excessively reduced when the component B is used in an amount of above 2.5% by weight and the component C cannot display its effective actions and results when it is used in an amount of below 0.05% by weight. Component A is used in the amount of 0.45% by weight, which weight is calculated from 0.3% of the upper limit of the special admixture $(A+B+C)$ by the formula, $3.0-2.5-0.05=0.45$.

What is claimed is:

1. A method for the preparation of a catalyst usable for catalytic cracking of hydrocarbons, characterized by comprising the steps of
   (I) pulverizing a carrier member selected from the group consisting of $\alpha$-alumina containing above 98% of $Al_2O_3$, SiC, $ZrO_2$, ZnO, $ThO_2$, $MoO_2$, $Fe_2O_3$ and a magnesium clinker containing above 96% of MgO and below 1% of an iron oxide into particles passing through a Tyler Standard 65-mesh sieve,
   (II) mixing the particles with a nickel oxide in an amount of 1 to 30% by weight and a binder which consists essentially of
   (A) 0.1 to 2.8% by weight of starch which has been treated with acid until the outer skin is destroyed and then heated to about 100° C. to about 300° C.
   (B) 0.05 to 2.5% by weight of a member selected from the group consisting of alkali metal carbonates and phosphates, calcium, magnesium and ammonium carbonates, chlorides, fluorides, sulfates and phosphates, zinc and iron phosphates and mixtures thereof, and
   (C) 0.05 to 2.5% by weight of a member selected from the group consisting of cholrides and phosphates of the material of step I, with the proviso that (1) the total weight of components A, B and C does not exceed 0.2 to 3% of the particles of step I, (2) that components B and C be different and (3) the ratio of $A/A+B+C$ is between 0.38 and 0.98, $B/A+B+C$ is between 0.017 and 0.945 and $C/A+B+C$ is between 0.017 and 0.945;
   (III) molding the mixture to a shaped product, drying the shaped product and
   (IV) then calcining the dried product at a temperature of about 1250° C. to about 1350° C. to produce the catalyst.

2. A method for the preparation of a catalyst usable for catalytic cracking of hydrocarbons, characterized by comprising the steps of pulverizing a carrier member selected from the group consisting of $\alpha$-alumina containing above 98% of $Al_2O_3$, SiC, $ZrO_2$, ZnO, $ThO_2$, $MoO_2$, $Fe_2O_3$ and a magnesium clinker containing above 96% of MgO and an iron oxide of below 1% into particles having a size passing through the Tyler Standard 65-mesh sieve, mixing the particles with a nickel oxide in an amount of 1 to 30% by weight and a special binder, which consists essentially of the components A, B and C as defined in claim 1, in an amount of 0.2 to 3% by weight to form a homogeneous mixture, molding the mixture to a shaped product, drying the shaped product, calcining the dried product at a temperature of about 1250° C. to about 1350° C. to produce a calcined product, immersing the calcined product in an aqueous solution containing nickel nitrate and calcining the immersed product to produce the catalyst.

3. The catalyst of the process of claim 1.
4. The catalyst of the process of claim 2.

References Cited

UNITED STATES PATENTS

| | | | |
|---|---|---|---|
| 2,409,494 | 10/1946 | Keating | 252—430 |
| 2,929,792 | 3/1960 | Arnold et al. | 252—430 |
| 3,203,903 | 8/1965 | Van Olphen | 252—430 X |

PATRICK P. GARVIN, Primary Examiner

U.S. Cl. X.R.

252—430; 208—124